(12) United States Patent
Handanhal Ramachandra et al.

(10) Patent No.: US 11,693,292 B2
(45) Date of Patent: Jul. 4, 2023

(54) TUNABLE EDGE COUPLER FOR PHOTONICS DEVICES

(71) Applicant: Cisco Technology, Inc., San Jose, CA (US)

(72) Inventors: Sujit Handanhal Ramachandra, Columbus, OH (US); Zhujun Yuan, Austin, TX (US); Jonathan D. Austin, San Leandro, CA (US); Prerak P. Shah, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 303 days.

(21) Appl. No.: 17/065,220

(22) Filed: Oct. 7, 2020

(65) Prior Publication Data

US 2022/0107543 A1 Apr. 7, 2022

(51) Int. Cl.
  *G02F 1/29* (2006.01)
  *G02F 1/295* (2006.01)

(52) U.S. Cl.
  CPC ........ *G02F 1/295* (2013.01); *G02F 2201/302* (2013.01); *G02F 2203/24* (2013.01)

(58) Field of Classification Search
  CPC . G02F 1/295; G02F 2201/302; G02F 2203/24
  See application file for complete search history.

(56) References Cited

U.S. PATENT DOCUMENTS

| | | | |
|---|---|---|---|
| 8,355,605 B1 * | 1/2013 | Wach | H04B 10/506 385/32 |
| 9,482,818 B2 | 11/2016 | Kachru et al. | |
| 9,557,585 B1 * | 1/2017 | Yap | H01L 23/5226 |
| 9,647,187 B1 * | 5/2017 | Yap | G01S 7/4817 |
| 9,726,818 B1 * | 8/2017 | Yap | G02B 6/10 |
| 9,746,743 B1 * | 8/2017 | Rabiei | G02B 6/12009 |
| 10,095,056 B1 | 10/2018 | Anderson et al. | |
| 10,126,500 B2 * | 11/2018 | Qi | G02B 6/1228 |
| 10,345,518 B1 * | 7/2019 | Yap | H01L 23/481 |
| 10,613,411 B1 * | 4/2020 | Yap | G01S 13/4463 |
| 2009/0142019 A1 * | 6/2009 | Popovic | G02B 6/1223 385/28 |

(Continued)

FOREIGN PATENT DOCUMENTS

| | | |
|---|---|---|
| CN | 107407778 A | 11/2017 |
| CN | 111367012 A | 7/2020 |

(Continued)

OTHER PUBLICATIONS

Rosa et al., Thermo-optic effects in multicore fibers for high-power lasers, Proc. SPIE 11357, Fiber Lasers and Glass Photonics: Materials through Applications II, 113570W (Apr. 1, 2020); doi: 10.1117/12.2563934 (Year: 2020).*

(Continued)

*Primary Examiner* — Peter Radkowski
(74) *Attorney, Agent, or Firm* — Patterson + Sheridan, LLP

(57) ABSTRACT

An apparatus includes a cladding layer and a plurality of waveguides. The cladding layer includes a central axis. The plurality of waveguides are disposed within the cladding layer and receive a light from a light source. The plurality of waveguides have refractive indices that are adjustable to change a mode of the light such that the mode of the light is steered towards the central axis.

14 Claims, 6 Drawing Sheets

(56) References Cited

U.S. PATENT DOCUMENTS

| | | | | |
|---|---|---|---|---|
| 2015/0247974 A1* | 9/2015 | Painchaud | ......... | G02B 6/12004 385/28 |
| 2017/0017034 A1* | 1/2017 | Painchaud | ............... | G02B 6/00 |
| 2017/0371102 A1* | 12/2017 | Painchaud | ............. | G02B 6/305 |
| 2018/0120504 A1* | 5/2018 | Qi | ........................ | G02B 6/3636 |
| 2018/0224605 A1* | 8/2018 | Painchaud | ............... | G02B 6/14 |
| 2019/0170936 A1* | 6/2019 | Qi | .......................... | G02B 6/124 |
| 2019/0384003 A1* | 12/2019 | Painchaud | ........... | G02B 6/2821 |
| 2020/0241202 A1 | 7/2020 | Vert et al. | | |
| 2020/0264391 A1 | 8/2020 | Tummidi | | |

FOREIGN PATENT DOCUMENTS

| | | |
|---|---|---|
| EP | 3111262 A1 | 1/2017 |
| EP | 3262448 B1 | 5/2021 |
| WO | 2015127565 A1 | 9/2015 |
| WO | 2018200161 A1 | 11/2018 |
| WO | 2020172079 A1 | 8/2020 |

OTHER PUBLICATIONS

Jialei Liu et al., "Recent advances in polymer electro-optic modulators," RSC Adv., Year: 2015, pp. 15784-15794 [Abstract Only].

Sebastian Romero-García et al., "Visible wavelength silicon nitride focusing grating coupler with AlCu/TiN reflector," Opt. Lett. 38, 2521-2523 (2013) [Abstract Only].

Teng et al., "Trident Shape SOI Metamaterial Fiber-to-Chip Edge Coupler," IEEE Xplore, Year: 2019, pp. 1-3.

Roberto Larrea et al., "Fiber-to-Chip Spot-Size Converter for Coupling to Silicon Waveguides in the O-Band," IEEE Photonics Technology Letters, vol. 31, No. 1, Dated: Jan. 1, 2019, pp. 31-34.

Tymon Barwicz, "An O-band Metamaterial Converter Interfacing Standard Optical Fibers to Silicon nanophotonic Waveguides," OFC 2015, 3 pages.

Barwicz et al., "A Metamaterial Converter Centered at 1490nm for Interfacing Standard Fibers to Nanophotonic Waveguides," 2016 Optical Society of America, 3 pages.

Masatoshi Tokushima, Akio Kamei, and Tsuyoshi Horikawa, "Dual-Tapered 10-μm-Spot-Size Converter with Double Core for Coupling Polarization-Independent Silicon Rib Waveguides to Single-Mode Optical Fibers," 2012 Appl. Phys. Express 5 022202.

Jia et al., "Mode size converter between high-index-contrast waveguide and cleaved single mode fiber using SiON as intermediate material," revised Aug. 24, 2014; accepted Aug. 25, 2014; published Sep. 19, 2014; vol. 22, No. 19, Optics Express.

M.-J Picard, Y. Painchaud, C. Latrasse, C. Larouche, F. Pelletier, M. Poulin, "Novel Spot-Size Converter for Optical Fiber to sub-m Silicon Waveguide Coupling with Low Loss, Low Wavelength Dependence and High Tolerance to Alignment," IEEE Xplore, 3 pages.

* cited by examiner

TUNABLE EDGE COUPLER FOR PHOTONICS DEVICES

TECHNICAL FIELD

Embodiments presented in this disclosure generally relate to photonics devices, and more specifically, to a tunable edge coupler for photonics devices.

BACKGROUND

Edge couplers couple optical fibers to other components of a system. For example, an edge coupler may couple an optical fiber to network equipment in a fiber optic network. As another example, an edge coupler may couple an optical fiber to test equipment in a laboratory. A problem with edge couplers is that light sources, such as optical fibers, lasers or other optical devices, may be misaligned when coupled to the edge coupler. As a result, light from the light source is directed away from an intended receiver, which results in signal loss or attenuation and a reduction in coupling efficiency.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
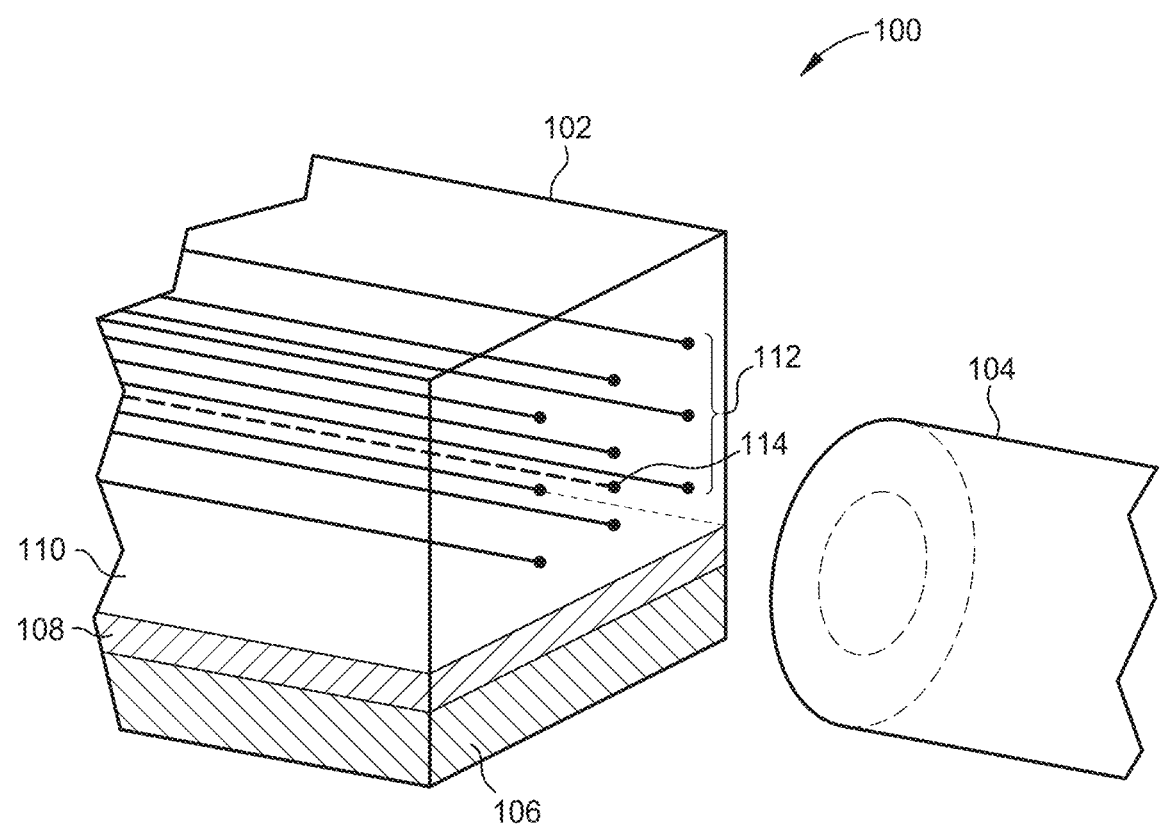
FIG. 1 illustrates an example system, according to one or more embodiments.

One embodiment presented in this disclosure is an apparatus that includes a cladding layer and a plurality of waveguides. The cladding layer includes a central axis. The plurality of waveguides are disposed within the cladding layer and receive a light from a light source. The plurality of waveguides have refractive indices that are adjustable to change a mode of the light such that the mode of the light is steered towards the central axis.

Another embodiment presented in this disclosure is a method for tunable edge coupling. The method includes adjusting refractive indices of a plurality of waveguides disposed within a cladding layer. The method also includes changing, by the plurality of waveguides, a mode of a light from a light source such that the mode of the light is steered towards a central axis of the cladding layer.

Another embodiment presented in this disclosure is an apparatus that includes a substrate, a bottom oxide layer, a cladding layer, a plurality of waveguides, and a central waveguide. The bottom oxide layer is disposed on the substrate. The cladding layer is disposed on the bottom oxide layer. The cladding layer includes a central axis. The plurality of waveguides is disposed within the cladding layer and receives a light from a light source. The plurality of waveguides have refractive indices that are adjustable to change a mode of the light such that the mode of the light is steered towards the central axis. The central waveguide is disposed within the cladding layer beneath the plurality of waveguides. The plurality of waveguides further change the mode of the light such that the mode of the light is steered towards the central waveguide.

An electric voltage may be applied to a waveguide of the plurality of waveguides to adjust a refractive index of the waveguide. Heat energy may be applied to a waveguide of the plurality of waveguides to adjust a refractive index of the waveguide. The plurality of waveguides may be arranged as a matrix surrounding the central axis.

In some embodiments, the apparatus includes a central waveguide disposed within the cladding layer beneath the plurality of waveguides. A waveguide of the plurality of waveguides includes a first end and a second end. The second end is tapered relative to the first end such that the second end steers light towards the central waveguide. The waveguide may include a grating at the first end of the waveguide. The grating may include a period that is less than a wavelength of the light from the light source.

In certain embodiments, the apparatus includes a substrate and a passivation layer disposed on the substrate. The cladding layer is disposed on the passivation layer.

Example Embodiments

This disclosure contemplates a tunable edge coupler that can be adjusted to direct light from a light source towards an intended receiver. The edge coupler includes a matrix of waveguides that have adjustable refractive indices. The refractive indices can be adjusted to redirect light entering the waveguides towards a central axis of the edge coupler. In this manner, even if the light source is misaligned, the waveguides can redirect the light towards the properly aligned position. As a result, the tunable edge coupler improves coupling efficiency and reduces signal loss and attenuation, in certain embodiments.

FIG. 1 illustrates an example photonics system 100. As seen in FIG. 1, the system 100 includes an edge coupler 102 and a light source 104. Generally, the edge coupler 102 shows some level of misalignment tolerance and couples light from the light source 104 into a waveguide even when the light source 104 is slightly misaligned. In particular embodiments, the system 100 is designed with misalignment tolerance in mind, which improves the coupling efficiency.

The light source 104 directs light at the edge coupler 102. The light source 104 may be any suitable light emitter or light carrier, such as, for example, an optical fiber, a light emitter, or a waveguide. When the light source 104 is aligned with the edge coupler 102, the light from the light source 104 may couple to the edge coupler 102 without significant signal loss or attenuation. When the light source 104 is misaligned with the edge coupler 102, the light from the light source 104 may experience significant signal loss and attenuation as the light proceeds through the edge coupler 102.

The edge coupler 102 directs light from the light source 104 to an intended receiver, such as, for example, a network component and/or an optical device. Generally, the edge coupler 102 steers light from the light source 104 towards a properly aligned position when the light source 104 is misaligned. In particular embodiments, the edge coupler 102 improves coupling efficiency and reduces signal loss and attenuation as the light is directed through the edge coupler 102. As seen in FIG. 1, the edge coupler 102 includes a substrate 106, a bottom oxide layer 108, a cladding layer 110, and one or more waveguides 112. Generally, the waveguides 112 are fabricated from a material whose refractive index can be adjusted. By adjusting the refractive indices of the waveguides 112, the waveguides 112 change a mode of light entering the waveguides 112 such that the light is steered towards a properly aligned position.

In certain embodiments, the edge coupler 102 directs light into 104. In other words, the edge coupler 102 performs the function of a light source that directs light towards 104. For example, edge coupler 102 may be a transmitter or a laser source. In these instances, 104 may be an optical fiber that receives light from the edge coupler 102. The refractive index of the waveguides 112 may be adjusted to redirect light entering waveguides 112 towards a properly aligned position in the optical fiber.

The substrate 106 forms a base for the edge coupler 102. The substrate 106 may be formed using any suitable material, such as, for example, silicon. The bottom oxide layer 108 may be positioned directly above substrate 106 and may prevent modes of light from the light source 104 leaking into the substrate 106.

The cladding layer 110 is formed on the bottom oxide layer 108. The cladding layer 110 may be formed using any suitable material. Generally, the cladding layer 110 may be formed using a low index material, such as, for example, silicon dioxide (SiO2), silicon oxynitride (SiON), or another suitable CMOS-compatible polymer. The cladding layer 110 may couple to the light source 104 to direct light from the light source 104 towards an intended receiver, such as network equipment or another optical device. The cladding layer 110 includes a central axis 114 that runs along a length of the cladding layer 110 from the light source 104 at the front of the edge coupler 102 towards an intended receiver at the back of the cladding layer 110. When the light source 104 is aligned with the edge coupler 102, light from the light source 104 may be directed substantially along or parallel to the central axis 114. When the light source 104 is misaligned with the edge coupler 102, light from the light source 104 is directed away from the central axis 114, such as, for example, towards an edge of the cladding layer 110.

Multiple waveguides 112 are disposed within the cladding layer 110. In some embodiments, the waveguides 112 are disposed in a matrix within the cladding layer 110. Generally, the waveguides 112 may be formed using a high-index material, such as silicon nitride (SiN), silicon (Si), silicon oxynitride (SiON), or any other suitable CMOS-compatible polymer. The waveguides 112 may have a length that runs parallel to the central axis 114. As will be discussed using subsequent figures, the waveguides 112 may have a refractive index that is adjustable. Adjusting the refractive index of individual waveguides 112 may cause the waveguides 112 to change a mode of light that enters the waveguides 112 such that the light is steered towards the central axis 114. In this manner, even if the light source 104 is misaligned, the waveguides 112 can be adjusted to steer the light from the light source 104 towards the central axis 114. In this manner, the waveguides 112 may improve coupling efficiency and reduce signal loss and attenuation.

Figure 2:
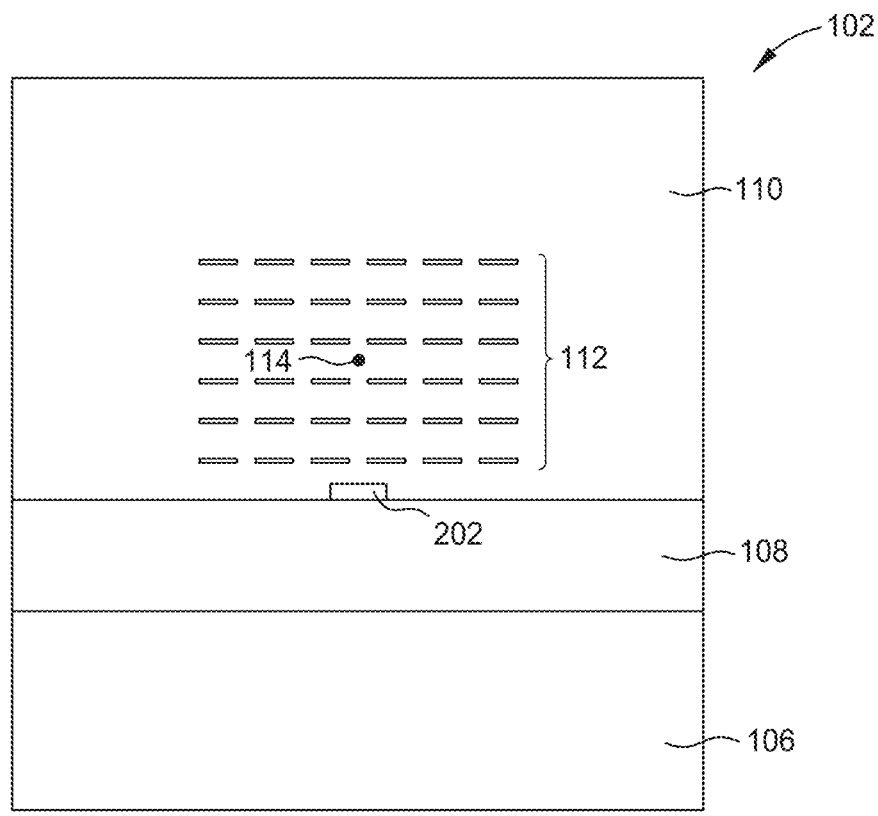
FIG. 2 illustrates a front view of an example edge coupler of the system of FIG. 1, according to one or more embodiments.

FIG. 2 illustrates a front view of an example edge coupler 102 of the system 100 of FIG. 1. As seen in FIG. 2, the edge coupler 102 includes a substrate 106, a passivation layer 108, a cladding layer 110, one or more waveguides 112, and a central waveguide 202. Generally, the waveguides 112 steer light entering the waveguides 112 towards a central axis 114 of the cladding layer 110. In particular embodiments, the edge coupler 102 improves coupling efficiency and reduces signal loss and attenuation.

As discussed previously, the substrate 106 forms a base for the edge coupler 102, and the bottom oxide layer 108 may be formed on substrate 106. The cladding layer 110 is then formed on the bottom oxide layer 108. The waveguides 112 are disposed within the cladding layer 110. The waveguides 112 may form a matrix within the cladding layer 110. As seen in FIG. 2, the matrix of waveguides 112 surround the central axis 114. In this manner, the matrix of waveguides 112 can steer a light towards the central axis 114 regardless of the direction of misalignment. The waveguides 112 may have refractive indices that are adjustable. In one embodiment, adjusting the refractive index of one or more waveguides 112 causes these waveguides 112 to change a mode of light such that the light is steered towards a central axis 114 of the cladding layer 110.

The central waveguide 202 is positioned within the cladding layer 110 beneath the waveguides 112 and on top of the bottom oxide layer 108. The central waveguide 202 extends along a length of the edge coupler 102, parallel to the central axis 114 of the cladding layer 110. The central waveguide 202 may couple to an intended receiver such that light entering the edge coupler 102 is directed through the central waveguide 202 to the intended receiver. In particular embodiments, the waveguides 112 may be tapered such that the waveguides 112 direct light towards the central waveguide 202. Stated differently, the width of the waveguides 112 may reduce from a front end of the waveguides 112 near the light source 104 towards an opposite end of the waveguides 112 in the interior of the cladding layer 110. The taper may be any suitable shape (e.g., linear or parabolic taper). As a result, light entering the waveguides 112 is directed towards the central axis 114, and at the tail end of the waveguides 112, the waveguides 112 direct the light towards the central waveguide 202. The central waveguide 202 then directs the light towards the intended receiver.

Figure 3:
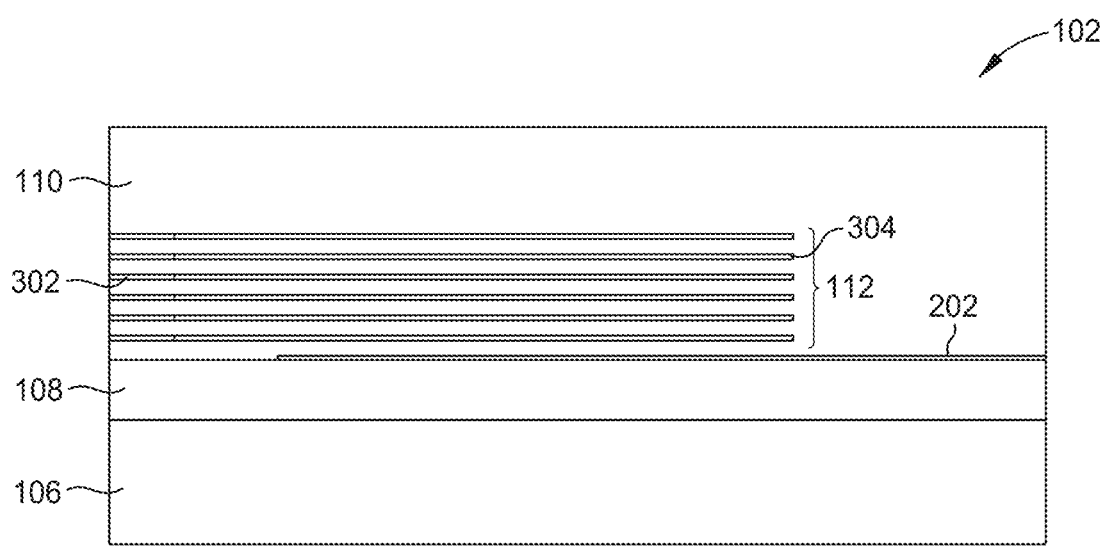
FIG. 3 illustrates a side view of an example edge coupler of the system of FIG. 1, according to one or more embodiments.

FIG. 3 illustrates a side view of an example edge coupler 102 of the system 100 of FIG. 1. As seen in FIG. 3, the edge coupler 102 includes a substrate 106, a bottom oxide layer 108, a cladding layer 110, one or more waveguides 112, and a central waveguide 202. Generally, the waveguides 112 direct light towards the central waveguide 202. The central waveguide 202 then directs the light to an intended receiver coupled to the edge coupler 102.

As discussed previously, the substrate 106 forms a base for the edge coupler 102, and the bottom oxide layer 108 is formed on top of the substrate 106. The cladding layer 110 is formed on top of the bottom oxide layer 108. The waveguides 112 are disposed within the cladding layer 110 and may be arranged as a matrix. The central waveguide 202 is positioned within the cladding layer 110 and may be positioned on top of the bottom oxide layer 108 and beneath the waveguides 112.

The waveguide 112 includes a front end 302 and a tail end 304. Light from the light source 104 may enter the waveguide 112 through the front end 302. The light may travel through the waveguide 112 towards the tail end 304. In particular embodiments, the tail end 304 of the waveguide 112 is tapered relative to the front end 302, such that the light traveling through the waveguide 112 towards the tail end 304 is directed downwards, towards the central waveguide 202. For example, the waveguide 112 may have a parabolic taper from front end 302 to tail end 304 such that the width of the waveguide 112 reduces moving from the front end 302 to the tail end 304 to form a parabolic shape. This taper may cause the waveguide 112 to direct the light towards the central waveguide 202. The central waveguide 202 then directs the light towards an intended receiver coupled to the edge coupler 102. As a result, the waveguide 202 may direct light towards a central axis 114 and towards the central waveguide 202.

Figure 4A:
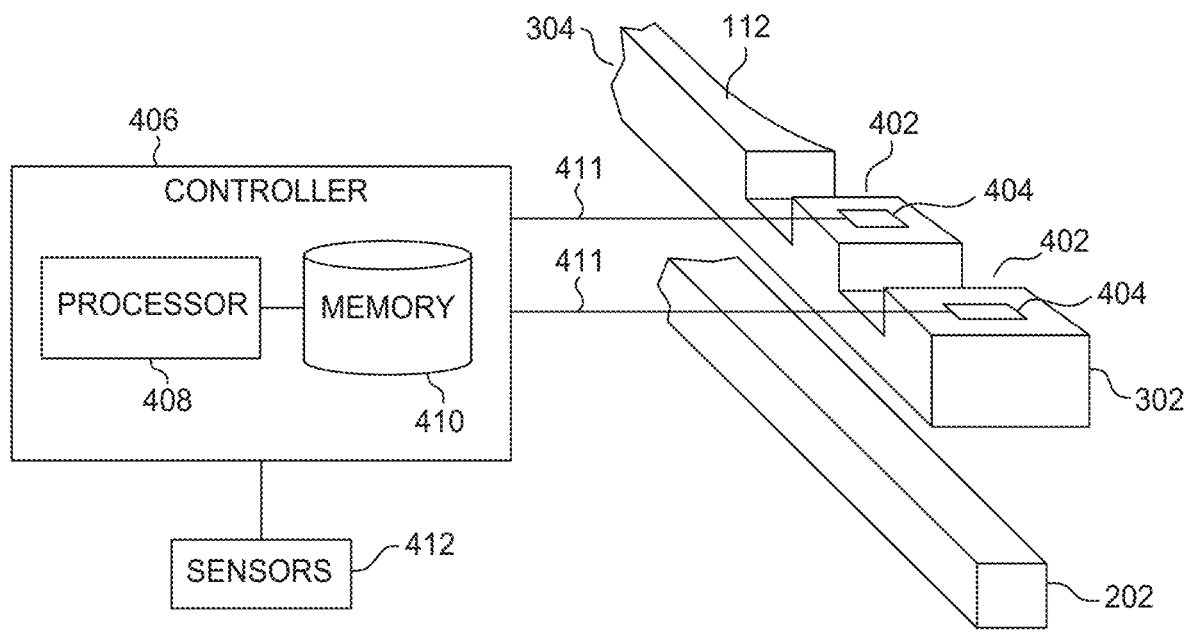
FIGS. 4A and 4B illustrate example waveguides of the system of FIG. 1, according to one or more embodiments.
Figure 4B:
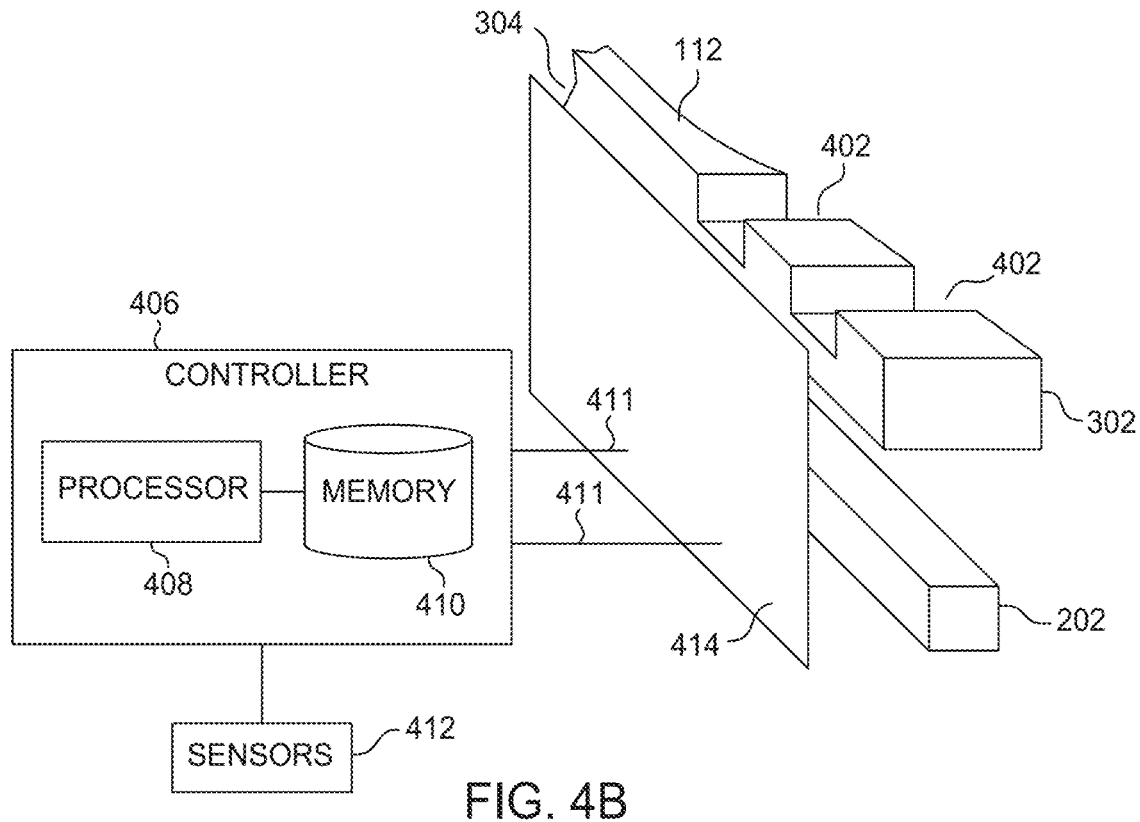

FIGS. 4A and 4B illustrate example waveguides 112 of the system 100 of FIG. 1. As seen in FIGS. 4A and 4B, the structure of a waveguide 112 may include particular features that assist in directing light through the waveguide 112. For example, a grating 402 may be included near the front end 302 of the waveguide 112. Additionally, the waveguide 112 may taper parabolically from the front end 302 towards the tail end 304 of the waveguide 112.

In FIG. 4A, the grating 402 is formed near the front end 302 of the waveguide 112. The grating 402 includes raised portions and lowered portions. In certain embodiments, the grating 402 is formed by etching portions of the waveguide 112 to form the lowered portions. The grating 402 may increase the tunability of the waveguide 112 by increasing the range of indices that can be attained by tuning. The grating 402 may help reduce the effective index of the mode in the waveguide 112 and by changing the duty cycle, the effective index also changes. As a result, the grating 402 allows the waveguide 112 to be tuned to a wider range of indices, which allows the edge coupler 102 to couple to many different sources with different effective indices without changing the material used to form the waveguide 112. The grating 402 may include any suitable number of raised portions and lowered portions. A period of the grating 402 is considered the sum of the length of a raised portion and the length of a lowered portion. The grating 402 is a sub-wavelength grating with a period that is less than the wavelength of light entering the waveguide 112.

The tapering of the waveguide 112 from the front end 302 towards the tail end 304 may assist in directing light in the waveguide 112 towards the central waveguide 202. In certain embodiments, the tapering may be a parabolic taper. The parabolic taper helps transform the mode of the waveguide 112 adiabatically while keeping the overall length of the waveguides 112 and/or the edge coupler 102 short.

As discussed above, the waveguides 112 have a refractive index that is adjustable. By adjusting the refractive index of the waveguides 112, the waveguides 112 may be tuned to direct light towards a central axis 114 of the cladding layer 110. In this manner, the waveguides 112 may be tuned to direct light towards a properly-aligned position even when the light source 104 is misaligned. The refractive index of the waveguides 112 may be adjusted using any suitable mechanism. For example, the refractive index of the waveguides 112 may be adjusted using electro-optical techniques or thermo-optical techniques.

FIG. 4A shows the refractive index of the waveguide 112 being adjusted using an electro-optical technique. As seen in FIG. 4A, a controller 406 applies electrical signals (e.g., electric voltage) to contacts 404 to adjust the refractive index of the waveguide 112. Controller 406 may determine a magnitude of the electrical signal based on data from one or more sensors 412 (e.g., optical sensors that detect an intensity of light coupled to the edge coupler 102). The electrical signal causes an electric field in the waveguide 112 to change, which results in modulation of the refractive index of the waveguide 112 (e.g., through the Pockels effect and the Kerr effect). In certain embodiments, the electrical signal adjusts the refractive index of the waveguide 112 such that the waveguide 112 directs light towards the central axis 114 of the cladding layer 110. In particular embodiments, adjusting the refractive index of the waveguide 112 improves coupling efficiency and reduces signal loss and attenuation. As seen in FIG. 4A, controller 406 includes a processor 408 and a memory 410. Processor 408 and memory 410 may be configured to perform any of the functions of controller 406 described herein.

Processor 408 is any electronic circuitry, including, but not limited to microprocessors, application specific integrated circuits (ASIC), application specific instruction set processor (ASIP), and/or state machines, that communicatively couples to memory 410 and controls the operation of controller 406. Processor 408 may be 8-bit, 16-bit, 32-bit, 64-bit or of any other suitable architecture. Processor 408 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 408 may include other hardware that operates software to control and process information. Processor 408 executes software stored on memory to perform any of the functions described herein. Processor 408 controls the operation and administration of controller 406 by processing information received from other components, such as light sensors, another controller, and/or memory 410. Processor 408 may be a programmable logic device, a microcontroller, a microprocessor, any suitable processing device, or any suitable combination of the preceding. Processor 408 is not limited to a single processing device and may encompass multiple processing devices.

Memory 410 may store, either permanently or temporarily, data, operational software, or other information for processor 408. Memory 410 may include any one or a combination of volatile or non-volatile local or remote devices suitable for storing information. For example, memory 410 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 410, a disk, a CD, or a flash drive. In particular embodiments, the software may include an application executable by processor 408 to perform one or more of the functions described herein.

In the example of FIG. 4A, controller 406 applies electrical signals (e.g., direct current electric voltage or alternating current electric voltage) via wires or traces 411 to electrical contacts 404 on the waveguide 112. The electrical contacts 404 are disposed on the raised portions of the grating 402. In some embodiments, the electrical contacts 404 are disposed on the lowered portions. In certain embodiments, the electrical contacts 404 are disposed on both the raised and lowered portions. In some embodiments, the electrical contacts 404 are disposed on the sides of the raised and/or lowered portion. The magnitude of the electrical signal applied to electrical contacts 404 may determine the refractive index of the waveguide 112. Stated differently, varying the magnitude of the electrical signal applied to the electrical contacts 404 varies the refractive index of the waveguide 112. For example, the controller 406 may vary the magnitude of an electrical voltage or current applied to electrical contacts 404 to vary the refractive index of the waveguide 112. In certain embodiments, the controller 406 may include a sensor that detects an intensity of light at the edge coupler 102. The controller 406 may then vary the electrical signal to these waveguides 112 based on this detected intensity to adjust the refractive indices of the waveguides 112 so that these waveguides 112 steer the light towards the central axis 114 of the cladding layer 110. In this manner, the controller 406 uses an electrical signal to correct a misaligned light source 104.

FIG. 4B illustrates a thermo-optic technique for adjusting the refractive index of the waveguide 112. As seen in FIG. 4B, a strip 414 is positioned near the waveguide 112. In particular embodiments, the strip 414 may be positioned near multiple waveguides 112 (e.g., all the waveguides 112 of a column or row of a matrix). The strip 414 may be made of any suitable material, such as, for example, tungsten. The controller 406 may apply an electrical signal to the strip 414 (e.g., via wires or traces 411) that causes the strip 414 to heat up. As the strip 414 heats up, heat energy is directed from the strip 414 towards the waveguide 112, which changes the refractive index of the waveguide 112. In certain embodiments, the more heat energy that is applied to the waveguide 112, the more the refractive index of the waveguide 112 changes.

In some embodiments, the index of the cladding layer 110 may be adjusted to increase the refractive index contrast between the waveguides 112 and the cladding layer 110, and consequently, to control the mode field distribution (shape of the mode). The cladding layer 110 may be provided with contacts 404 and/or heating strips 414 in the vicinity that may be used to adjust the index of the cladding layer 110. For example, the indices of the waveguides 112 may be changed to increase while the index of the cladding layer 110 is decreased, thus widening the index contrast and enabling good confinement of the mode to the waveguides 112.

Figure 5A:
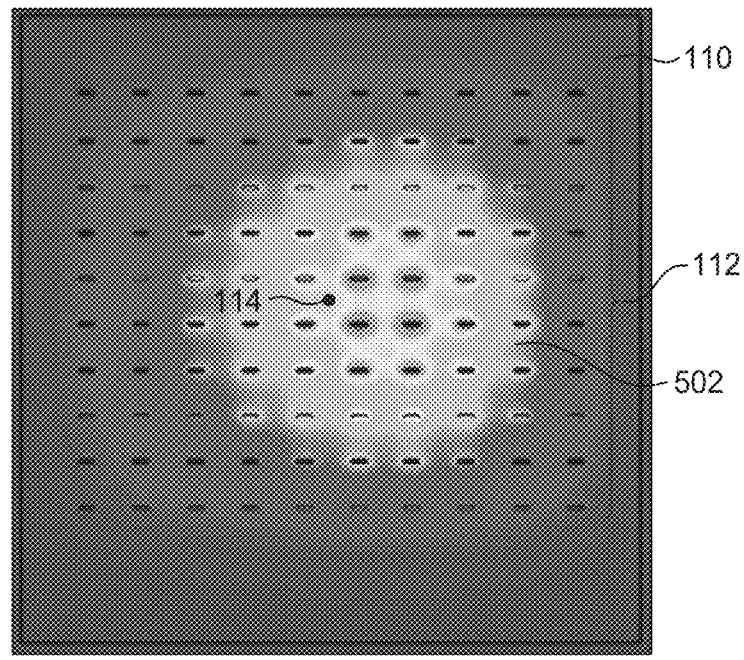
FIGS. 5A, 5B, 5C, and 5D illustrate the change in mode profile of light in the system of FIG. 1, according to one or more embodiments.
Figure 5B:
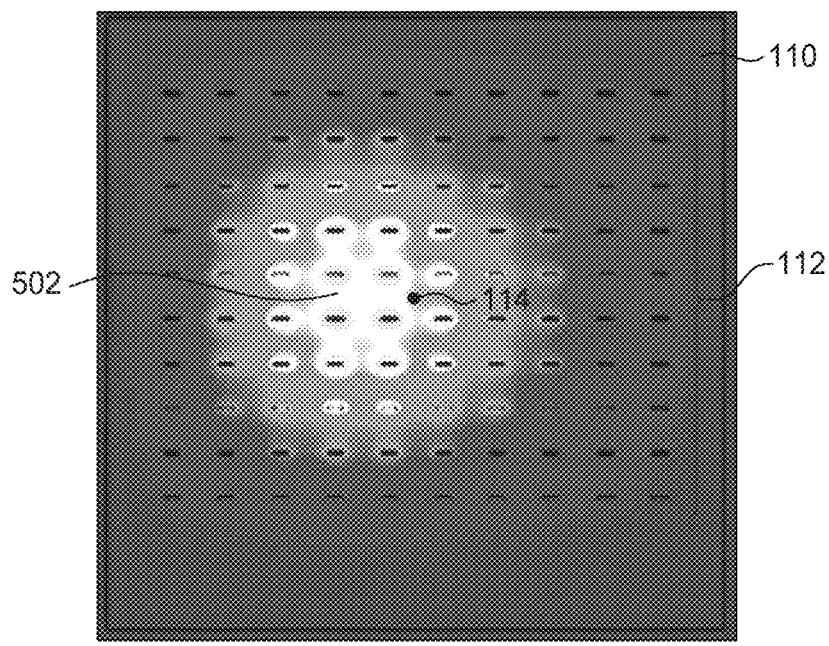
Figure 5C:
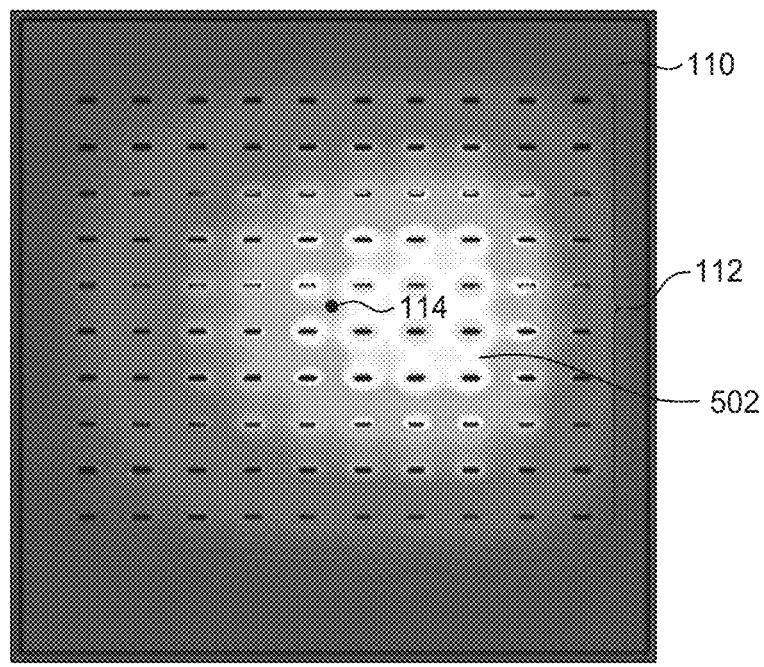
Figure 5D:
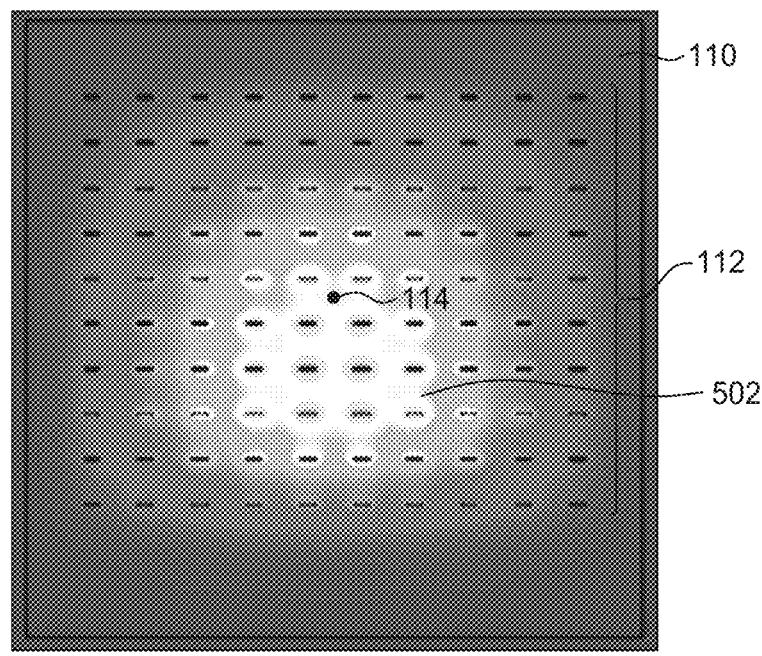

FIGS. 5A through 5D illustrate the change in mode profile of light in the system 100 of FIG. 1. As seen in each of these figures, a light 502 is directed towards a matrix of waveguides 112 in the cladding layer 110. Even if the light 502 is not aligned with the central axis 114 of the cladding layer 110, the waveguides 112 change the mode profile of the light 502 to steer the light 502 (e.g., a center of the light 502) towards the central axis 114. In the example of FIG. 5A, the light 502 is slightly offset to the right of the central axis 114. The refractive index of certain waveguides 112 is adjusted to change the mode profile of the light 502 such that the light 502 (or the mode of the light 502) is steered slightly to the left towards the central axis 114. In the example of FIG. 5B, the light 502 is slightly offset to the left of the central axis 114. The refractive index of certain waveguides 112 is adjusted to change the mode profile of the light 502 such that the light 502 (or the mode of the light 502) is steered slightly to the right towards the central axis 114. In the example of FIG. 5C, the light 502 is offset to the right of the central axis 114. The refractive index of certain waveguides 112 is adjusted to change the mode profile of the light 502 such that the light 502 (or the mode of the light 502) is steered to the left towards the central axis 114. In the example of FIG. 5D, the light 502 is offset to the bottom of the central axis 114. The refractive index of certain waveguides 112 is adjusted to change the mode profile of the light 502 such that the light 502 (or the mode of the light 502) is steered upwards towards the central axis 114.

As seen in each of these examples, the refractive indices of certain waveguides 112 are adjusted to change the mode of the light 502 such that the light 502 (or the mode of the light 502) is steered towards the central axis 114. Importantly, the mode of the light 502 is steered towards the central axis 114. In this manner, even if the light source 104 is misaligned, the waveguides 112 may steer the light 502 from the light source 104 towards the central axis 114 and towards a properly aligned position.

In certain embodiments, the controller 406 receives data from one or more sensors 412 (e.g., optical sensors) that detect the intensity of light from the light source 104. The controller 406 may determine, based on the detected intensity, how to adjust the indices of waveguides 112 to steer the light towards a properly aligned position. For example, the controller 406 may determine, based on these signals, a position of the light or light source 104. The controller 406 may also determine, based on these signals, the waveguides 112 that are receiving light from the light source 104. The controller 406 then determines how far the light should be steered to be properly aligned with the central axis 114. The more misaligned the light or light source 104 is, the more the light is steered towards the central axis 114.

For example, the controller 406 may determine from the sensor data that the light or the light source 104 are misaligned such that the light is being directed towards a right edge of the cladding layer 110. The light source 104 could be tilted such that the light from the light source 104 is entering edge coupler 102 at an angle that directs towards the right edge of the cladding layer 110. In response, the controller 406 determines that the refractive indices of the waveguides 112 that are receiving the light should be adjusted to steer the light towards the left.

As another example, the controller 406 may determine from the sensor data that the light source 104 is misaligned such that the light is being directed downwards towards a bottom edge of the cladding layer 110. The light source 104 could be mis-positioned and/or tilted such that the light from the light source 104 is entering edge coupler 102 at a downwards angle. In response, the controller 406 determines that the refractive indices of the waveguides 112 that are receiving the light should be adjusted to steer the light upwards.

The controller 406 adjusts the refractive index of certain waveguides 112 (e.g., the waveguides 112 that are receiving light from the light source 104) such that these waveguides 112 steer the light towards the central axis 114. For example, the controller 406 may send an electrical signal (e.g., electric voltage) to electrical contacts 404 on the waveguides 112 to change an electric field within the waveguides 112. The change in the electric field caused by the electrical signal modulates the refractive index of these waveguides 112. The magnitude of the electrical signal affects how much the refractive index is modulated. As another example, the controller 406 may send an electrical signal to a strip 414 to heat up the strip 414. The strip 414 then transfer heat energy to certain waveguides 112. The magnitude of the electrical signal affects how much heat is transmitted by strip 414. As more heat energy is absorbed by the waveguides 112, the more the refractive index of the waveguides 112 changes. In both examples, the controller 406 may determine how much the refractive indices of the waveguides 112 need to change and send a suitable electrical signal to electrical contacts 404 or strip 414 to bring about that change.

Figure 6:
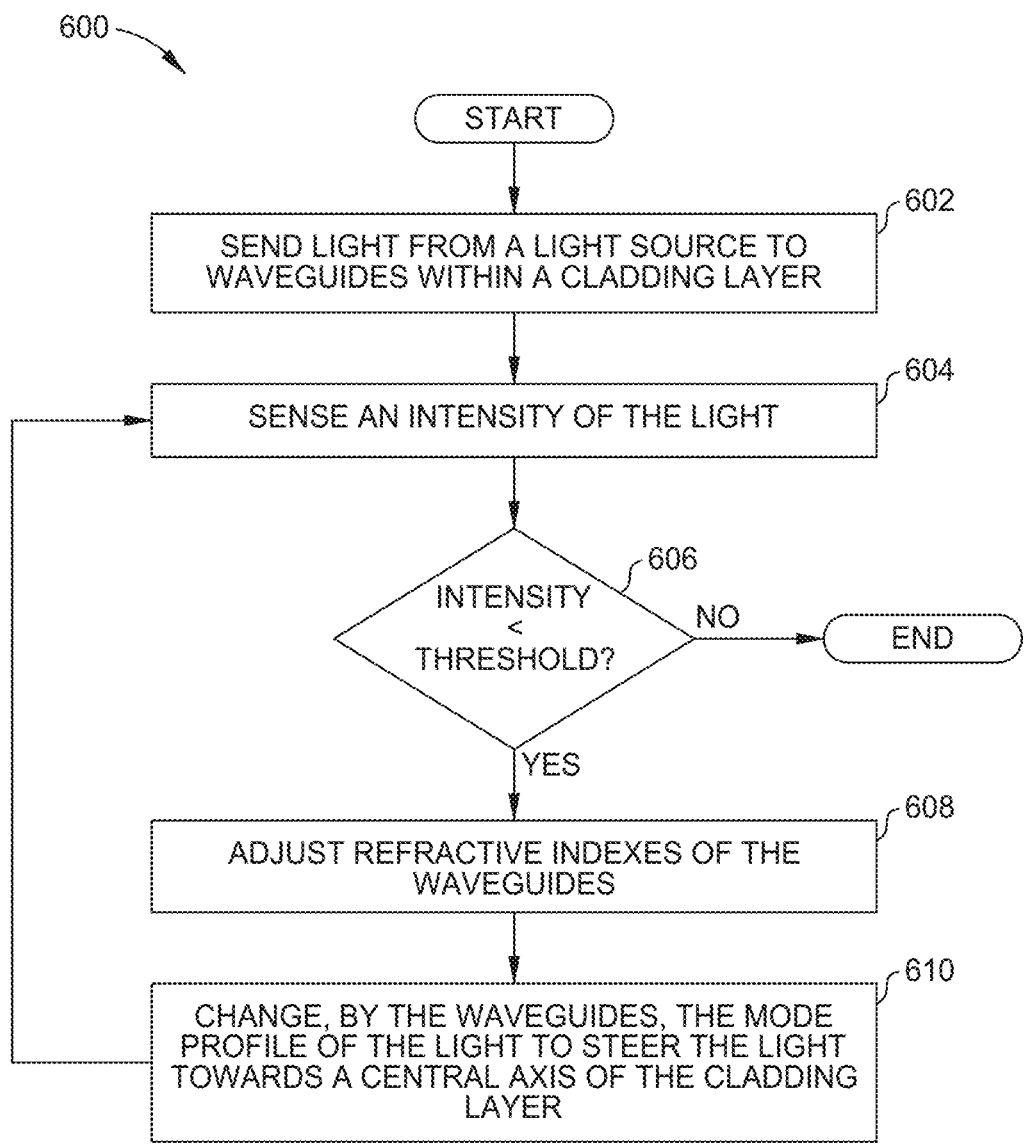
FIG. 6 is a flowchart showing a process for tunable edge coupling in the system of FIG. 1, according to one or more embodiments.

FIG. 6 is a flow chart showing a process for tunable edge coupling in the system 100 of FIG. 1. In particular embodiments, by performing method 600, coupling efficiency is improved and signal loss and attenuation is reduced.

In step 602, a light source 104 sends light to waveguides 112 within a cladding layer 110 of an edge coupler 102. A machine or a human operator may position the light source 104 to direct light at the waveguides 112. The light source 104 may be aligned with the central axis 114 of the cladding layer 110 or misaligned with the central axis 114 of the cladding layer 110.

In step 604, a controller 406 may sense an intensity of the light at the edge coupler 102. The controller 406 may sense the intensity by one or more sensors 412 that produce signals proportional to the intensity of the light. In step 606, the controller 406 compares the intensity of the light to a threshold to determine whether the light source 104 is misaligned. If the intensity of the light is below the threshold, then the controller 406 determines that the light source 104 is misaligned and proceeds to step 608. If the intensity of the light is above the threshold, then the controller 406 determines that the light source 104 is aligned and ends method 600.

In step 608, the controller 406 adjusts a refractive index of waveguides 112 disposed within the cladding layer 110 to change a mode of the light such that the light is steered towards the central axis 114 of the cladding layer 110. The controller 406 may determine the adjustments to be made based on the detected intensity of the light. For example, one or more sensors 412 may be used to detect an intensity of the light. The controller 406 may use the sensor data to determine how misaligned the light is. Based on that determination, the controller 406 adjusts the refractive index of certain waveguides 112 using an electro-optical technique or a thermo-optical technique such that the waveguides 112 steer the light towards the central axis 114.

For example, based on data from one or more sensors 412, the controller 406 may determine that the light is not properly aligned with the central axis 114. The more misalignment in the light or light source 104, the more that the light should be steered back towards the central axis 114. The controller 406 then determines how much the refractive indices of the waveguides 112 receiving the light should be changed to steer the light towards the central axis 114. The controller 406 then sends an electrical signal to change these refractive indices. For example, the controller 406 may send an electrical signal (e.g., electric voltage) to electrical contacts 404 on the waveguides 112 to change an electric field within the waveguides 112. The change in the electric field caused by the electrical signal modulates the refractive index of these waveguides 112. The magnitude of the electrical signal affects how much the refractive index is modulated. As another example, the controller 406 may send an electrical signal to a strip 414 to heat up the strip 414. The strip 414 then transfer heat energy to certain waveguides 112. As more heat energy is absorbed by the waveguides 112, the more the refractive index of the waveguides 112 changes.

In step 610, after adjusting the refractive indices of the waveguides 112, the waveguides 112 change the mode profile of the light such that light is steered towards the central axis 114 of the cladding layer 110. For example, adjusting the refractive indices of the waveguides 112 may cause the waveguides 112 to steer the light in a particular direction. The controller 406 may adjust the refractive indices of certain waveguides 112 that are receiving the light to cause these waveguides 112 to steer the light towards the central axis 114.

In this manner, the waveguides 112 steer the light towards a properly aligned position even if the light source 104 is misaligned. In particular embodiments, the waveguides 112 improve coupling efficiency and reduce signal loss and attenuation.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations; the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An apparatus comprising:
a cladding layer comprising a central axis; and
a plurality of waveguides disposed within the cladding layer and configured to receive a light from a light source, the plurality of waveguides comprising electrical contacts arranged to receive an electrical signal, wherein the electrical signal adjusts refractive indices of the plurality of waveguides such that the plurality of waveguides redirect a mode of the light towards the central axis.

2. The apparatus of claim 1, wherein the plurality of waveguides are arranged as a matrix surrounding the central axis.

3. The apparatus of claim 1, further comprising a central waveguide disposed within the cladding layer beneath the plurality of waveguides, a waveguide of the plurality of waveguides comprises a first end and a second end, the second end is tapered relative to the first end such that the second end steers light towards the central waveguide.

4. The apparatus of claim 3, the waveguide comprises a grating at the first end of the waveguide, wherein the grating comprises a period that is less than a wavelength of the light from the light source.

5. The apparatus of claim 1, further comprising a substrate and a passivation layer disposed on the substrate, the cladding layer disposed on the passivation layer.

6. A method comprising:
sending one or more electric signals to electrical contacts of a plurality of waveguides disposed within a cladding layer to adjust refractive indices of the plurality of waveguides; and
redirecting, by the plurality of waveguides, a mode of a light from a light source towards a central axis of the cladding layer.

7. The method of claim 6, wherein the plurality of waveguides are arranged as a matrix surrounding the central axis.

8. The method of claim 6, wherein a waveguide of the plurality of waveguides comprises a first end and a second end, the second end is tapered relative to the first end such that the second end directs light towards a central waveguide disposed within the cladding layer beneath the plurality of waveguides.

9. The method of claim 8, wherein the waveguide comprises a grating at the first end of the waveguide and wherein the grating comprises a period that is less than a wavelength of the light from the light source.

10. The method of claim 6, wherein the cladding layer is disposed on a passivation layer and wherein the passivation layer is disposed on a substrate.

11. An apparatus comprising:
a substrate;
a bottom oxide layer disposed on the substrate;
a cladding layer disposed on the bottom oxide layer, the cladding layer comprising a central axis;
a plurality of waveguides disposed within the cladding layer and configured to receive a light from a light source, the plurality of waveguides arranged to receive heat energy, wherein the heat energy adjusts refractive indices of the plurality of waveguides such that the plurality of waveguides redirect a mode of the light towards the central axis; and
a central waveguide disposed within the cladding layer beneath the plurality of waveguides, the plurality of waveguides further configured to change the mode of the light such that the mode of the light is steered towards the central waveguide.

12. The apparatus of claim 11, wherein the plurality of waveguides are arranged as a matrix surrounding the central axis.

13. The apparatus of claim 11, wherein a waveguide of the plurality of waveguides comprises a first end and a second end, the second end is tapered relative to the first end such that the second end directs light towards the central waveguide.

14. The apparatus of claim 13, the waveguide of the plurality of waveguides comprises a grating at the first end, wherein the grating comprises a period that is less than a wavelength of the light from the light source.

* * * * *